UNITED STATES PATENT OFFICE 2,671,089

SHAPED ARTICLES FROM POLYMERS AND COPOLYMERS OF ACRYLONITRILE, AND PROCESS OF PRODUCING SAME

Pierre Mosse, Lyon, France, assignor to Societe Rhodiaceta, Paris, France, a French company No Drawing. Application May 12, 1953, Serial No. 354,641

2 Claims. (Cl. 260—32.6)

This invention relates to the production of shaped articles from polymers and co-polymers of acrylonitrile and has particular relation to new and improved plastic compositions and a process for producing such articles by the so-called dry or evaporative process.

The main object of my present invention is to provide compositions which consist of solutions of polymers or co-polymers of acrylonitrile in dimethylformamide and contain cyclohexanone in amounts stated hereinafter in order to obtain products of improved physical character.

Another object of my invention consists in the conversion of said compositions into shaped products which can be stretched easier and at lower temperatures than the hitherto known products of this type.

Other objects and the advantages of the invention will be apparent from the appended claims and the following specification.

It has been known to produce filaments, threads, films and similar articles from polymers of acrylonitriles by evaporation of solutions of said polymers in dimethylformamide and, in order to avoid or reduce discoloration of such solutions, it has been suggested to add to such solutions 0.1 to 10%, based on the weight of the polymer, of substantially colorless ketones, whereby the ketone was used in an amount up to 1.1%, based on the weight of dimethylformamide.

I have now found that by the introduction into solutions of acrylonitrile polymers in dimethylformamide, of cyclohexanone in an amount of (a) at least 5%, based on the weight of the polymer and (b) at least 2%, based on the weight of the dimethylformamide, compositions are obtained, the technical character of which is entirely different from the character of acrylonitrile solutions hitherto known. Both conditions, i. e. the presence of cyclohexanone in an amount of at least 5%, based on the weight of the polymer, and in an amount of at least 2%, based on the weight of dimethylformamide, must be met in order to obtain the favorable effects according to my invention. In carrying out the invention, the upper limit of cyclohexanone is 200%, based on the weight of the polymer.

The compositions of my present invention remain in the condition of liquid suspension up to temperatures substantially higher than solutions prepared under otherwise equal conditions without the addition of cyclohexanone in amounts corresponding to my invention. This is an important technical advantage in numerous industrial uses, because it prevents essential changes of viscosity of the composition as a result of accidental rises of temperature during storage, or any procedure of malaxation, or transportation. This improvement has the particular advantage of permitting direct mixing of the polymer and solvent at ordinary room temperature or even up to 60°–70° C. with easy and quick formation of a homogeneous, and stable mixture.

Furthermore, I have found that when the above mentioned compositions are utilized for the production of films, threads and filaments and similar articles, it is particularly easy to spin them and they yield products which can be stretched easier than the compositions hitherto known. The products obtained from the compositions according to my invention can be stretched at relatively low temperatures even several days after their formation. In contrast to this, it is known that films, threads and the like, prepared according to known methods from compositions of acrylonitrile polymers, must be subjected to stretching at temperatures above 100° C., which is a substantial technical complication.

The following examples, to which the invention is not limited, illustrate some embodiments and advantages of the invention.

Example 1

The following mixture was subjected to malaxation at 20° C. until a homogeneous composition was formed:

(A)

15 parts by weight of polyacrylonitrile of a specific viscosity of 0.380 at 0.2% in dimethylformamide;
83.3 parts by weight of dimethylformamide;
1.7 parts by weight of cyclohexanone (corresponding to 11.3% by weight of the polyacrylonitrile).

Malaxation was carried out in the same manner with the following composition:

(B)

15 parts by weight of the same polyacrylonitrile as in (A);
85 parts by weight of dimethylformamide.

At 40° C., viscosity of composition (A) is four times lower and at 70° C., six times lower than that of composition (B).

Composition (A) is much easier to handle during malaxation and transportation, even if accidental overheating occurs in these steps.

When heated at 130° C., compositions (A) and (B) have similar viscosities, and this fact indicates that the presence of cyclohexanone does not substantially affect the character of the polymer.

Example 2

The following two compositions are prepared:

(C)

24 parts by weight of polyacrylonitrile;
74.5 parts by weight of dimethylformamide;
1.5 parts by weight of cyclohexanone (corresponding to 6.25% by weight of polyacrylonitrile);

(D)

24 parts by weight of polyacrylonitrile;
76 parts by weight of dimethylformamide;

Each of these compositions is heated to 130° C. and cast to form a film which is dried in a current of hot air of 100° C. The films are stored for 3 days and then subjected to stretching.

The film obtained from composition (C) is stretched easily to 500% and more, in water of 98° C.; this is not possible in the case of the film produced from composition (D).

Example 3

A product of the following composition is subjected to spinning according to a conventional method:

24 parts by weight of polyacrylonitrile;
73 parts by weight of dimethylformamide;
3 parts by weight of cyclohexanone (i. e. 12.5% by weight of the polymeric polyacrylonitrile).

The filaments formed are stored for 4 days in a ventilated chamber in order to facilitate recovery of the spinning solvent.

After that period of time, the filaments are perfectly capable of being stretched to 600% and more, in water of 98°–99° C., while filaments obtained in identical manner from a composition comprising 24 parts by weight of polyacrylonitrile, 76 parts by weight of dimethylformamide and containing no cyclohexanone, requires after the same period of storage, temperatures above 100° C. (for example a glycerine bath heated at 120° or 130° C.) for a satisfactory stretching.

Example 4

A composition is prepared from the following ingredients:

22 parts by weight of a co-polymer obtained from 90% acrylonitrile and 10% vinylimidazol;
62 parts by weight of dimethylformamide;
16 parts by weight of cyclohexanone (i. e. 73% by weight of the polymer).

This composition is treated in the manner described in Example 3 and the results obtained are similar to those of Example 3.

It will be understood that my invention is not limited to the specific materials, steps, procedures, conditions and other specific details described above and may be carried out with various modifications without departing from the scope of the invention, as defined in the appended claims. For example, the compositions used according to my invention may contain other admixtures, such as dyes, pigments, adjuvants and the like, small amounts of products of acid character and any other desired addition. Furthermore, the above example of the stretching procedure serve merely to illustrate a technical advantage resulting from the use of compositions according to my invention, but my invention is, of course, not limited to any particular procedure or means for stretching. However, the use of cyclohexanone in an amount corresponding to (a) at least 5%, based on the weight of the polymer or co-polymer of acrylonitrile and (b) simultaneously at least 2% by weight of the dimethylformamide, is critical in carrying out my invention. In carrying out the invention cyclohexanone is used in these amounts, up to 200% by weight of the polymer, this amount of 200% being the upper limit of cyclohexanone in my invention.

The term "polymer of acyrolonitrile" is used in the present specification and claims to include also interpolymers and co-polymers of acrylonitrile.

The polymers, co-polymers and interpolymers of acrylonitrile used in carrying out my invention are prepared according to conventional methods, for example by polymerization of the dissolved or emulsified monomeric materials in the presence of a catalyst. I prefer the use of polymers or co-polymers in which at least about 85% of the polymer is acylonitrile, and the molecular weight of which is in the range of 15,000–250,000 or higher. Such polymers are not soluble in ordinary organic solvents. As further examples of materials suitable for the preparation of co-polymers or interpolymers of acrylonitrile, the following may be mentioned: vinyl and vinylidene halides, vinyl esters and ethers, acrylic and methacrylic acids and their derivatives (particularly their amides), styrene, vinylimidazol, etc.

Reference is made to my co-pending patent application Ser. No. 210,996, filed February 14, 1951, for "Production of Shaped Articles From Polymers and Co-Polymers of Acrylonitrile," of which this is a continuation-in-part, now abandoned.

What is claimed is:

1. Plastic composition comprising substantially the following ingredients: (a) a polymer of acrylonitrile containing at least 85% of acrylonitrile in the molecule; (b) dimethylformamide in an amount sufficient for dissolving said polymer; and (c) cyclohexanone used in a quantity amounting to at least 5% by weight of the polymer and at least 2% by weight of the dimethylformamide, the upper limit of cyclohexanone being 200% by weight of the polymer.

2. In a process for producing shaped products from a polymer of acrylonitrile containing at least 85% of acrylonitrile in the molecule, dissolved in dimethylformamide, the step of incorporating cyclohexanone in an amount of 5 to 200%, based on the weight of the polymer and of at least 2%, based on the weight of dimethylformamide, during mixing and dissolving the polymer in dimethylformamide.

PIERRE MOSSE.

No references cited.